United States Patent
Caplan et al.

(10) Patent No.: US 10,157,349 B2
(45) Date of Patent: Dec. 18, 2018

(54) AUTOMATED METHODOLOGY FOR INDUCTIVE BIAS SELECTION AND ADAPTIVE ENSEMBLE CHOICE TO OPTIMIZE PREDICTIVE POWER

(71) Applicant: COLDLIGHT SOLUTIONS, LLC, Wayne, PA (US)

(72) Inventors: Ryan Todd Caplan, Huntingdon Valley, PA (US); Bruce F. Katz, Philadelphia, PA (US); Joseph John Pizonka, Phoenixville, PA (US)

(73) Assignee: PTC Inc., Needham, MA (US)

( * ) Notice: Subject to any disclaimer, the term of this patent is extended or adjusted under 35 U.S.C. 154(b) by 521 days.

(21) Appl. No.: 14/822,469

(22) Filed: Aug. 10, 2015

(65) Prior Publication Data

US 2016/0042292 A1 Feb. 11, 2016

Related U.S. Application Data

(60) Provisional application No. 62/035,797, filed on Aug. 11, 2014.

(51) Int. Cl.
*G06F 15/18* (2006.01)
*G06N 99/00* (2010.01)

(52) U.S. Cl.
CPC .................. *G06N 99/005* (2013.01)

(58) Field of Classification Search
USPC ........................................................ 706/12
See application file for complete search history.

(56) References Cited

U.S. PATENT DOCUMENTS 6,488,617 B1 * 12/2002 Katz ................... A61B 5/0482
600/26
6,728,689 B1 4/2004 Drissi et al.
(Continued)

FOREIGN PATENT DOCUMENTS

EP 2688015 A1 1/2014

OTHER PUBLICATIONS

Proposed system for estimating intrinsic value of stock using Monte Carlo simulation Sehba Shahabuddin Siddiqui; Vandana A. Patil 2017 International Conference on Intelligent Computing and Control Systems (ICICCS) Year: 2017 pp. 723-729 IEEE Conferences.*
(Continued)

*Primary Examiner* — Michael B Holmes
(74) *Attorney, Agent, or Firm* — Pepper Hamilton LLP

(57) ABSTRACT

A computer-implemented method of automating inductive bias selection includes a computer receiving a plurality of examples, each example providing a plurality of feature-value pairs. The computer constructs an inductive bias dataset which correlates each respective example in the plurality of examples with numerical indications of training quality. The numerical indications of training quality for each respective example are generated by creating a plurality of models, with each model corresponding to a distinct set of inductive biases. The training quality for each respective model is evaluated when applied to the respective example. The computer uses the inductive bias dataset to select a plurality of inductive biases for application to one or more new datasets.

21 Claims, 8 Drawing Sheets

(56) References Cited

U.S. PATENT DOCUMENTS

| | | | | |
|---|---|---|---|---|
| 7,403,815 | B2* | 7/2008 | Katz | A61B 5/048 600/544 |
| 8,370,280 | B1 | 2/2013 | Lin et al. | |
| 8,694,540 | B1 | 4/2014 | Lin et al. | |
| 10,019,542 | B2* | 7/2018 | Caplan | G16H 50/70 |
| 2005/0277813 | A1* | 12/2005 | Katz | A61B 5/048 600/300 |
| 2009/0119090 | A1* | 5/2009 | Niu | G06F 17/24 704/1 |
| 2011/0235901 | A1* | 9/2011 | Hu | G06K 9/00248 382/159 |
| 2012/0239613 | A1 | 9/2012 | Danciu et al. | |
| 2013/0297538 | A1 | 11/2013 | Gosink et al. | |
| 2014/0188768 | A1 | 7/2014 | Bonissone et al. | |
| 2015/0310351 | A1* | 10/2015 | Caplan | G06N 99/005 706/12 |
| 2015/0363693 | A1* | 12/2015 | Caplan | G06N 5/022 706/46 |
| 2016/0042292 | A1* | 2/2016 | Caplan | G06N 99/005 706/12 |
| 2017/0046460 | A1* | 2/2017 | Caplan | G06F 17/00 |
| 2017/0083796 | A1* | 3/2017 | Kim | G06K 9/00369 |
| 2018/0121811 | A1* | 5/2018 | Caplan | G06F 7/02 |

OTHER PUBLICATIONS

A methodological approach for algorithmic composition systems' parameter spaces aesthetic exploration Iván Paz; Angela Nebot; Enrique Romero; Francisco Mugica; Alfredo Vellido 2016 IEEE Congress on Evolutionary Computation (CEC) Year: 2016 pp. 1317-1323 IEEE Conferences.*

Machine Learning for Better Models for Predicting Bond Prices, Swetava Ganguli, Jared Dunnmon {swetava, jdunnmon}@cs.stanford. edu Computing time on Stanford Corn, Barley and Rye clusters 2017 pp. 1-6.*

Semi-Supervised Recursive Autoencoders for Predicting Sentiment Distributions, Richard Socher, Jeffrey Pennington, Eric H. Huang, Andrew Y. Ng, Christopher D. Manning Proceedings of the 2011 Conference on Empirical Methods in Natural Language Processing, pp. 151-161,Edinburgh,Scotland,UK, Jul. 27-31, 2011 Association for Computational Linguistics.*

Runtime Application Behavior Prediction Using a Statistical Metric Model Ruhi Sarikaya; Canturk Isci; Alper Buyuktosunoglu IEEE Transactions on Computers Year: 2013, vol. 62, Issue: 3 pp. 575-588 IEEE Journals & Magazines.*

Predicting Zillow Estimation Error Using Linear Regression and Gradient Boosting Darshan Sangani; Kelby Erickson; Mohammad Al Hasan 2017 IEEE 14th International Conference on Mobile Ad Hoc and Sensor Systems (MASS) Year: 2017 pp. 530-534 IEEE Conferences.*

International Search Report dated Dec. 21, 2015 in corresponding International Patent Application No. PCT/US2015/044487.

* cited by examiner

AUTOMATED METHODOLOGY FOR INDUCTIVE BIAS SELECTION AND ADAPTIVE ENSEMBLE CHOICE TO OPTIMIZE PREDICTIVE POWER

CROSS REFERENCE TO RELATED APPLICATIONS

This application claims the benefit of U.S. Provisional Application Ser. No. 62/035,797 filed Aug. 11, 2014, which is incorporated herein by reference in its entirety.

TECHNICAL FIELD

The present invention relates generally to methods, systems, and apparatuses for automatically selecting inductive bias and adaptively selecting models from an ensemble to increase the overall predictive power of a modeling methodology.

BACKGROUND

Inductive Learning by Examples is the process by which a model of a given phenomenon is constructed by repeated exposure to representative examples. This is a supervised learning technique; i.e., the learner is given the desired output in addition to a feature-based description of the example. The goal is to minimize the error between this desired output and the predicted output of the model, both for the examples presented to the model, as well as for future examples not yet seen. Techniques for Inductive Learning by Examples include, without limitation, regression, Bayesian models, neural networks, decision trees, support vector machines, and variants thereof.

The inductive learning paradigm has been broadly adopted within a number of verticals including retail, health and pharma, manufacturing, financial, etc. with great success in recent years—a key aspect of this success is that in many cases, models constructed in this manner will outperform their human counterparts with respect to predictive accuracy. The reason for this superior performance lies in the tradeoff between the complexity of the reasoning process and the complexity of the data. While the human intellect is still far superior in its breadth and depth of reasoning capabilities, short-term memory and other capacity limitation make it a poor choice for the inductive processing of large data sets: in this case, a simpler algorithm repeatedly applied to this set will often yield superior results.

However, the fact that the models themselves are constructed purely algorithmically does not imply that the entire process is automatic; in fact, a number of choices must be made by data scientists or other similar data experts before and during this process if high quality results are to be obtained.

In particular, two key areas involving considerable human intervention, hindering complete automation and inhibiting the formation of optimal results, remain. The first such area is the selection of models from an ensemble of models on the basis of the current example during scoring (i.e., making a prediction for that example). The second area falls under broad umbrella of inductive bias, that is, the set of collective decisions before an algorithm is applied to a data set that skews the predictive results in one direction or another.

SUMMARY

Embodiments of the present invention address and overcome one or more of the above shortcomings and drawbacks, by providing methods, systems, and apparatuses that utilize a recursive learning process to select from a plurality of existing models in order to provide a predictive evaluation for an example. As noted above, there are two areas where human intervention is required in conventional learning systems: selection of models from an ensemble and inductive balance. Using the techniques described herein, both of these areas may be subjected to the same inductive learning process as the direct construction of models by example, with the expectation that these "meta-analytic" processes will also come to outperform their human counterparts by dint of the complexities and size of the problems at hand.

According to some embodiments of the present invention, a computer-implemented method of automating inductive bias selection includes a computer receiving examples, with each example providing feature-value pairs. The computer constructs an inductive bias dataset which correlates each respective example with numerical indications of training quality. The numerical indications of training quality for each example are generated by creating a plurality of models, with each model corresponding to a distinct set of inductive biases. The computer evaluates the training quality for each respective model when applied to the respective example and uses the inductive bias dataset to select inductive biases to apply to new datasets.

Various enhancements, refinements, and other modifications may be made to the aforementioned method in different embodiments. For example, in some embodiments, the distinct set of inductive biases may include bias corresponding to a model type, model parameters corresponding to a respective model type, an ensemble modeling technique, a measure of conservativeness with respect to model applicability and model accuracy, an indication of sampling method, and/or an indication of technique for imputing missing data for particular data types. In some embodiments, the examples used in the aforementioned method comprise time-series data and the distinct set of inductive biases comprises one or more wavelet transformations.

The aforementioned method may also be extended to use external data sources. For example, in some embodiments, the distinct set of inductive biases comprises a one or more nominal biases corresponding to an external data source. In one embodiment, the inductive bias dataset is used to score a plurality of available external data sources and generate a model which applies each of the available external data sources in proportion with its respective score.

According to other embodiments of the present invention, a computer-implemented method of performing recursive learning based on feature values includes a computer generating model for a plurality of input features. The computer receives examples which provide input feature values corresponding to the input features. Then, the computer may apply a recursive learning process to each respective example. This recursive learning process includes selecting a preferred model providing a lowest predicted error value when applied to the respective example, and associating the respective example with the preferred model. After a new example with new input feature values is received, the computer may use the new input feature values to select a similar example from the plurality of examples. The computer may then identify one or more corresponding preferred models associated with the similar example and apply the corresponding preferred models to the new example. In some embodiments, the method further includes associating each of the models with a score which is indicative of model quality. The corresponding preferred models associated with the similar example may be identified based on these scores. Then, to determine the final prediction, the computer averages the results generated by applying the corresponding preferred models to the new example.

In some embodiments, the aforementioned method of performing recursive learning may be applied to a hierarchical system of recursive learning. For example, in one embodiment, the method further comprises creating a plurality of recursive learners, with each respective recursive learner corresponding to distinct set of parameters. The method also includes creating a high-order recursive learner which is configured to select from the recursive learners based on feature-value pairs associated with a particular example. The high-order recursive learner is used to select a recursive learner from the recursive learners based on the new input feature values. The selected recursive learner uses the new input feature values to select the similar example from the existing examples and identifies the corresponding preferred models associated with that example. In some embodiments, each of the recursive learners corresponds to a distinct learning method. For example, in one embodiment, at least one of the plurality of recursive learners corresponds to a decision tree learning method and at least one of the plurality of recursive learners corresponds to a neural network learning method.

In some embodiments, the aforementioned method further comprises partitioning the new input feature values into a first set of input feature values and a second set of input feature values. The computer uses the first set of input feature values to select a first similar example from the plurality of examples, identifies one or more first preferred models associated with the first similar example, and applies the one or more first preferred models to the first set of input feature values. The computer uses the second set of input feature values to select a second similar example from the plurality of examples, identifies one or more second preferred models associated with the second similar example, and applies the one or more second preferred models to the second set of input feature values. Additionally, in some embodiments, a final prediction is generated by averaging (i) first results generated by applying the first preferred models to the first set of input feature values and (ii) second results generated by applying the second preferred models to the second set of input feature values.

According to other embodiments, a modeling computing system comprises a processor configured to retrieve a plurality of examples from an example database and execute a plurality of modeling components. The modeling components include a model generation component which is configured to generate a plurality of models, each model corresponding to a specified set of inductive biases. The modeling components also include an inductive bias dataset component which is configured to construct an inductive bias dataset which correlates each respective example in the plurality of examples with numerical indications of training quality. The numerical indications of training quality for each respective example are generated by creating models (each model corresponding to a distinct set of inductive biases) and evaluating training quality for each respective model when applied to the respective example. In some embodiments, the inductive bias dataset component is further configured to use the inductive bias dataset to select inductive biases for application to one or more new datasets.

In some embodiments, the modeling components included in the aforementioned system further include a recursive learning component which is configured to apply a recursive learning process to each respective example included in the plurality of examples. This recursive learning process comprises the selection of a preferred model from the plurality of models. The preferred model provides the lowest predicted error value when applied to the respective example. The respective example is then associated with the preferred model.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to an automated methodology for inductive bias selection and adaptive ensemble choice to optimize predictive power for a given set of examples. According to some embodiments, the techniques described herein are applied to automate inductive bias selection. More specifically, a set of feature value pairs is correlated with a numerical indication of the quality of learning. A set formed in this manner will have multiple instances of the dataset characteristics coupled with varying biases. This allows the learning engine to determine which set of biases tends to work better with which types of datasets. The techniques described herein may also be applied to model selection. In particular, in some embodiments, a higher-order, or recursive, learner is trained to choose the best model among a group of models for a particular example in question and, by virtue of the properties of inductive learning; this generalizes to new examples not presented to the recursive learner.

Figure 1:
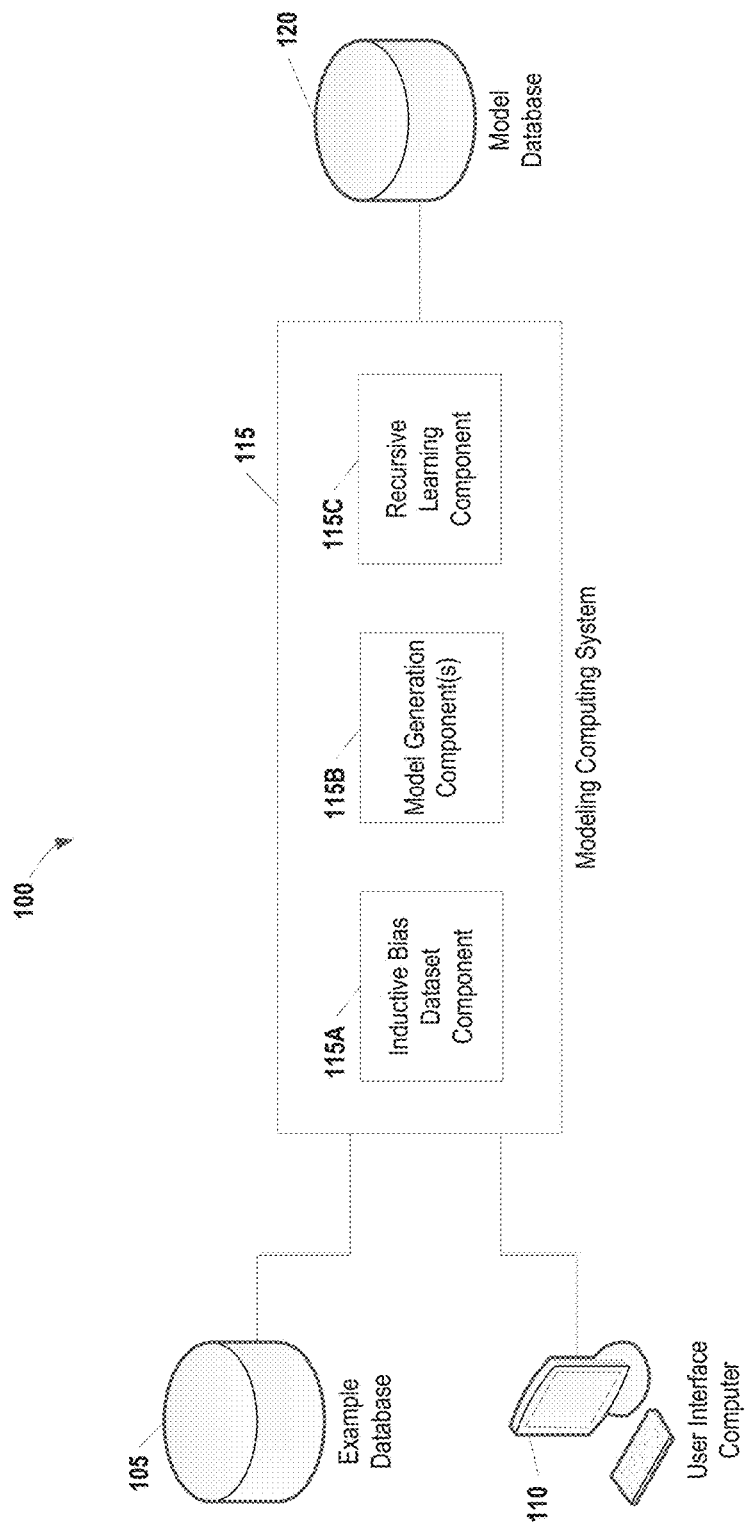
FIG. 1 provides an overview of a system for inductive bias selection and adaptive ensemble choice, according to some embodiments of the present invention.

FIG. 1 provides an overview of a system 100 for inductive bias selection and adaptive ensemble choice, according to some embodiments of the present invention. Briefly, the system 100 applies machine learning techniques to generate predictive models for a given set of examples and inductive bias values. Each example is a collection of features and values and may include, but is not limited to, a person (e.g., a customer or patient), a record, or a device.

Continuing with reference to FIG. 1, the system 100 includes a Modeling Computing System 115 operably coupled to an Example Database 105 and a User Interface Computer 110. Based on input received from the User Interface Computer 110, the Modeling Computing System 115 retrieves datasets of examples from the Example Database 105 and processes those datasets using a variety of components (described in further detail below) to generate one or more predictive models which are then stored in a Model Database 120 or utilized immediately in predictive analysis of new examples.

The Modeling Computing System 115 includes an Inductive Bias Dataset Component 115A which is configured to construct an inductive bias dataset which correlates examples with numerical indications of training quality (i.e., scores). More specifically, the Inductive Bias Dataset Component 115A uses a plurality of machine learning models generated by Model Generation Components 115B (described below) to create a model for a given set of inductive biases. Then, these models are used to create a score for a set of dataset features. Applying this general concept over varying sets of inductive biases and corresponding models, the resulting inductive bias dataset indicates how particular dataset features are affected by different inductive biases values. The process of generating the inductive bias dataset is described in greater detail below with reference to FIG. 2.

The Modeling Computing System 115 also includes one or more Model Generation Components 115B. Each Model Generation Component 115B is configured to generate a specific type of model (e.g., neural networks, naïve Bayes, support vector machines, etc.) for a given set of parameters (e.g., within neural networks, the number of hidden units, the learning rate, or the momentum values). Once models are generated, they may be stored in the Model Database 120 for later use in evaluating new examples.

A Recursive Learning Component 115C applies a recursive learning process to a group of examples to identify one or more preferred models for each example. More specifically, a preferred model is selected from a group of models (e.g., those available in the Model Database 120). This preferred model provides the lowest predicted error value when applied to the respective example. Once the preferred model has been selected, an association between the example and the model may be recorded (e.g., in the Model Database 120). When a new example is received, a similar past example may be identified. Then, the preferred model for this past example may be applied to the new example.

It should be noted that the components 115A, 115B, 115C, illustrated in FIG. 1 are only a sampling of the different components that may be included in the Modeling Computing System 115. In some embodiments, the functionality corresponding to these components can be merged and/or supplemented with additional functionality. Additionally, in other embodiments, the Modeling Computing System 115 may include additional components that provide additional modeling functionality not described herein.

General induction, unlike deduction, is an under-constrained problem, and there will be multiple solutions (or models) for the same inputs. Inductive bias refers to the entire set of decisions or biases that produce a particular model (or ensemble of models) from an inductive training set. Consider, for example, a simple thought experiment in which you are given a bag of marbles. You reach in and pull out the first marble and note that it is blue. You do the same for the second and third marbles, and these are also blue. What can be said regarding the color of the next marble depends on your bias towards a conservative or more risky inductive strategy. Consistent with the latter, it is possible to conclude that the next marble will be blue; the former, Humean extreme is to conclude that nothing can be said regarding the rest of the bags contents. It is also possible to have an intermediate strategy inferring that it is likely that the next chosen marble will be blue.

In this instance, it is difficult to argue for the correctness of one approach over any other. However, in general, it may be possible to orient one's bias so as to improve predictive power over as yet to be seen events. Each inductive learning data set has its own set of characteristics ranging from subject matter to purely statistical measures. These characteristics form the basis for a set of feature-value pairs, which in conjunction with the particular set of biases introduced to form the predictive model will yield a learning quality measure based on the models ability to predict future or unseen examples. Thus, the task is to form a meta-model that predicts and therefore prescribes the appropriate set of biases to invoke when approaching a problem with a set of given characteristics. As in standard inductive learning itself, one is not hoping for a perfect result, in the sense that one can choose an optimal bias; rather, the task is to choose biases that are likely to improve the inductive methodology.

Figure 2:
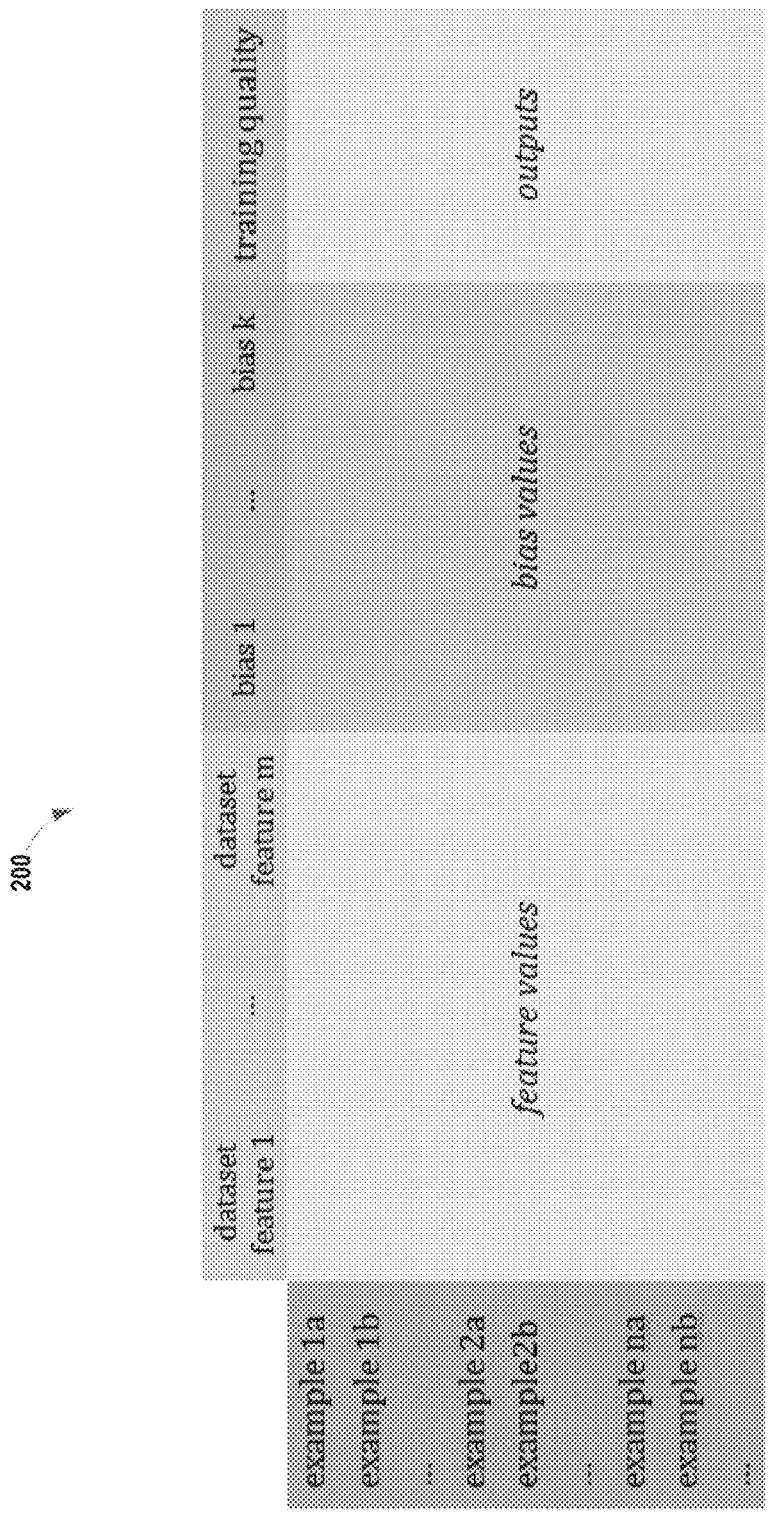
FIG. 2 shows a table that illustrates a general method of creating an inductive bias learning set, according to some embodiments.

FIG. 2 shows a table 200 that illustrates a general method of creating an inductive bias learning set, according to some embodiments. As with typical inductive learning, the task is to correlate a set of feature value pairs with an output, in this case a numerical indication of the quality of learning. Unlike the typical inductive data sets, however, a set formed in this manner will have multiple instances of the dataset characteristics coupled with varying biases. Thus, example 1a represents a particular dataset coupled with a set of inductive biases, 1b the same dataset with a different set of biases, and so forth. This allows the learning engine to determine which set of biases tends to work better with which types of datasets.

Dataset features may include but are not limited to the following: (1) the subject matter or vertical from which the dataset is drawn, such as medical, construction, retail, etc.; (2) the sub-area from which the dataset is drawn, such as within medical, heart disease, fractures, or diabetes; (3) the size of the dataset, both respect to the number of rows (i.e., the number of training examples) or the number of columns (i.e., the number of independent variables); (4) the nature of the output, e.g., a nominal value, a probability, or a numerical amount; (5) the distribution or skew of the output; (6) statistical properties of the data columns including measures of standard deviation, measures of skew, number of missing values, etc.; (7) measures between columns or between columns and the output column such as mean correlation or mean mutual information.

Inductive biases included in the inductive bias dataset may include but are not limited to the following: (1) the type of model or models to use (2) within a given model, the parameters to be used; (3) the type of ensemble modeling technique such as averaging, gradient boost, or meta-learning as discussed below; (4) within a given ensemble technique, the parameters to be used, such as the number of models to incorporate, or the learning termination condition;

(5) the general notion of how conservative the model or ensembles should be, i.e., how tightly should the predictions conform to existing cases, and how far should they stray to produce models with greater applicability but possibly less accuracy; (6) the method for sampling the data in order to improve training speed or to improve predictive accuracy or both; and (7) the method of inputting missing data for particular data types (e.g., mean, median value, etc.).

Once constructed, the inductive bias dataset is no different than a standard dataset for an inductive learning problem, and similar techniques can be applied to associate a learning score with a given set of biases for a given problem. One can also apply the resulting model to a novel dataset in order to extract the predicted best set of biases to maximize predictability on novel data by iterating through the bias space or other more directed prescriptive modeling techniques.

In some embodiments, the general concepts discussed above with respect to the inductive bias learning set may be used to select transformations for time series data. Time series data comprises data in which a number of values from time windows in the past are used to predict a future value. These data may be autoregressive, in the sense that they derive from prior values for the same variable but sourcing from past instances, or hetero-regressive in the sense that they derive from other variables entirely. For example, to predict traffic on a given highway one may use past values at 5-minute intervals for the same highway, or one may use values in the same time frame for different highways or other external factors such as the weather. Regardless of their source, the collection of values at discrete time windows in the past (one window back, two windows back, etc.) is not necessarily optimal for predicting the future. For example, instead of using these raw values, the derivative or change in these values from one window to the next may be more predictive of future events.

In general, one can carry out an arbitrary series of transformations on these successive window values, including the special but significant case of wavelet transforms. Wavelet transforms are time-bounded functions that are convolved with data across windows to produce a set of coefficients that may be in turn taken as inputs for the learning task, and have been shown to be useful in a wide variety of domains. However, like more conventional transformations such as derivative, volatility, and the like, it is difficult to know in advance which wavelet to apply to which dataset. One could, of course, try many and hope for the best, but this is expensive with respect to time and may lead to overfitting the data. Instead, one would like to extract from the thousands of possible transformations a subset that is likely to work well. This subset can be provided by the current paradigm if it is assumed that a model has been constructed along the lines described above where the biases are the individual transformations or collections thereof.

In other embodiments, an inductive bias learning set may be used to select external data sources. The selection of external data sources presents a similar problem to selecting transformations in that there is a potentially infinite set of factors that may help prediction, but ideally one would like to consider those that are likely to work best. Consider the problem for example of trying to predict a financial value from past events. There are many thousands of leading financial indicators alone one might consider, as well as other sources that may or may not be relevant such as world events, mean skirt length for women, beard incidence for men, etc. One can of course apply a priori reasoning to reject features that are unlikely to have bearing on a given set of predictions, but this is risky in that one might reject influencers that have predictive content for an unknown reason. It would be better if the analytical engine itself could filter the set of possibilities down to a manageable quantity. This can be provided by the above paradigm if the external data source were treated as a type of nominal bias, i.e., a bias that has many possible string-based values. For a new dataset, one could then quickly determine the value of an external data set for a given problem by scoring it with the inductive bias model, and then include sets in proportion to the score indicating their worth in the current context. In some embodiments, ontologies may be used to structure the contextual information. One example technique for utilizing such ontologies is provided in U.S. application Ser. No. 14/740,863 filed Jun. 16, 2015 and entitled "Architecture And Methodology For Performing Real-Time Autonomous Analytics Over Multiple Actual And Virtual Devices," the entirety of which is incorporated herein by reference.

Figure 3:
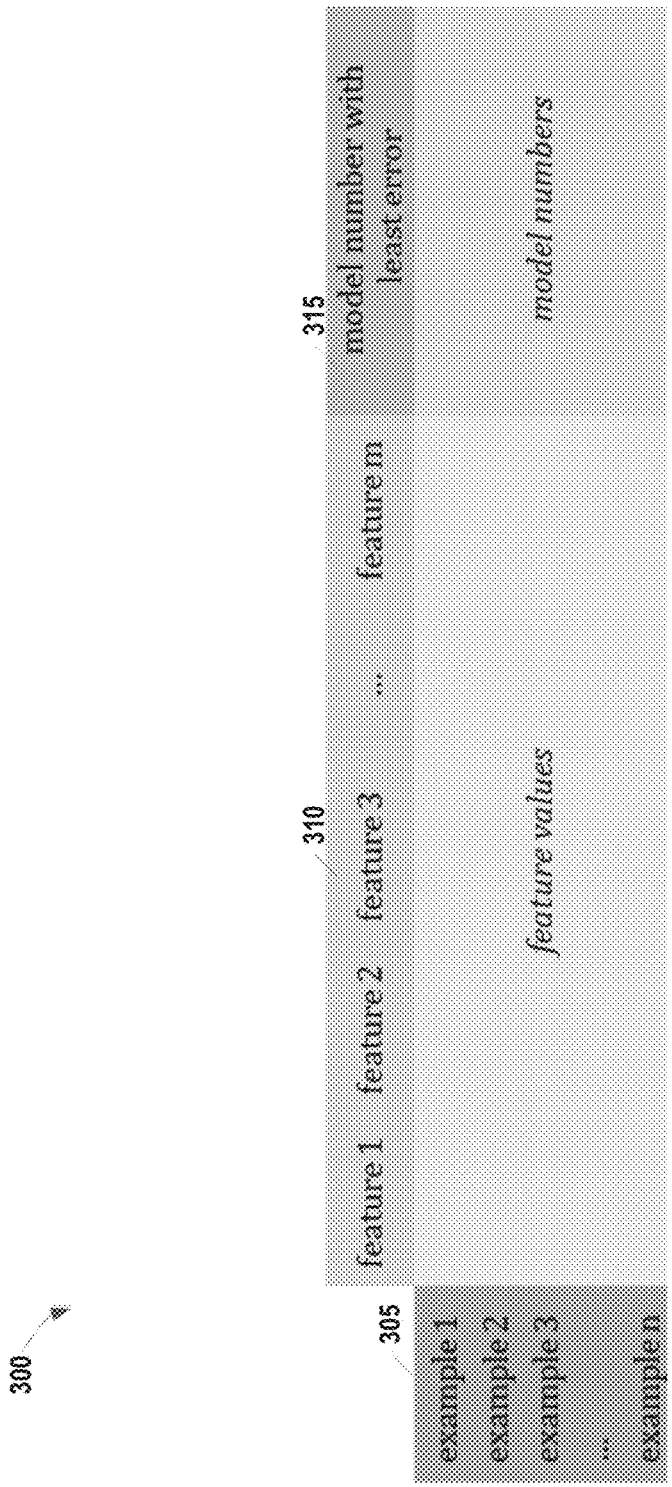
FIG. 3 shows a table that may be used in an inductive procedure, according to some embodiments of the present invention.

In addition to selecting biases, a pre-processing inductive learning methodology, the process of selecting models from an ensemble of such, a post-processing methodology, can also be automated. FIG. 3 shows a table 300 of examples for the recursive learner that may be used in an inductive procedure, according to some embodiments of the present invention. A central insight of higher-order model selection is that inductive learning can be used to solve the ensemble combination problem itself, in addition to solving the classification problem at the level of individual models. In order to carry out an inductive procedure, a table of inputs and outputs may be used. In the example of FIG. 3, the inputs features are the m features 305 of the n examples 310 used in the construction of the member models. However, the output 315 is replaced with the model number producing the least error for this example; here we assume that the inductive learning procedure produces multiple models for each input dataset. The definition of least error can vary according to different embodiments of the present invention. For example, in some embodiments, the least error is defined as the minimum of the absolute value between the predicted and actual output value. This is intuitive where the output is a numerical value (i.e., one model is the closest). However, when the decision is categorical (large, medium, small), more than one model could be correct. In this case, one model can be selected or all of the models with the correct answer may be used to derive the output data.

In effect, the higher-order, or recursive learner is being trained to choose the best model among the ensemble models for the particular example in question, and by virtue of the properties of inductive learning, this will generalize to new examples not presented to the recursive learner. This also suggests that any inductive method may be used to construct the recursive learner (and that this method may also be ensemble learning itself, as described in greater detail below).

Figure 4:
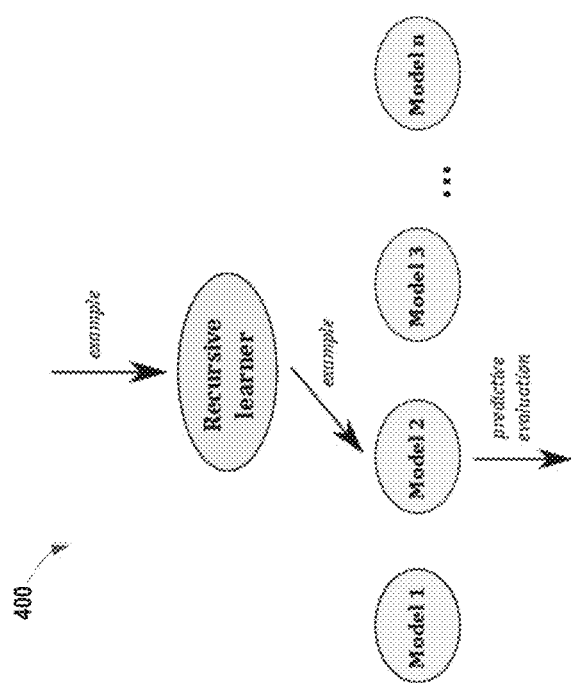
FIG. 4 provides an illustration of the process performed by the recursive learner, according to some embodiments of the present invention.

Once trained, the recursive learner is able to shunt a new example to the appropriate model. FIG. 4 provides an illustration of the process 400 performed by the recursive learner, according to some embodiments of the present invention. If the recursive learner is a discrete classifier such as a decision tree, then the model chosen will simply be the output of the classifier. If, however, the recursive learner is a continuous classifier such as neural network with one output unit per model a score will be associated with each model. The model with the highest such score (representing the lowest predicted error) will be chosen. Other methods of evaluating the ensemble are described in detail below.

In some embodiments, the top-performing models are averaged. Assume that the recursive learner produces scores representing model quality s1, s2, s3 ... sn for each of the n models for a given example. Instead of simply choosing the model k with the highest score sk, it is possible to choose the m models with the m highest scores. The outputs for these models can then be computed and averaged to produce a final prediction. Thus, this method represents a hybrid between recursive learning and an averaging technique.

In some embodiments, a model's contribution is inversely proportional to the predicted error. Instead of taking an average over the best m models, all models can be taken into consideration on the basis of the predicted error scores as follows. Let the weight for each model for a given example be $$w_i = s_i \approx (1-e_i),$$

where the $s_i$ are the evaluations of the worth of that model, presumed to be inversely proportional to the error for that example. Then, the ensemble evaluation over all models is given by:

$$\frac{\sum w_i v_i}{\sum w_i},$$

where $v_i$ is the predictive evaluation of the example for model i. Thus, in this example, the ensemble produces a value that is the normalized weighted sum of the models, with the weights proportional to the predicted quality of each model on each example.

In some embodiments, a single predicted output is learned from multiple model outputs. Instead of learning models that minimize the error for each input example, the recursive learner can learn how to combine the evaluations to produce a desired output. This is a generalization of the averaging ensemble method, with an equal contribution from each model replaced by a more general non-linear combination produced by the recursive learner.

Figure 5:
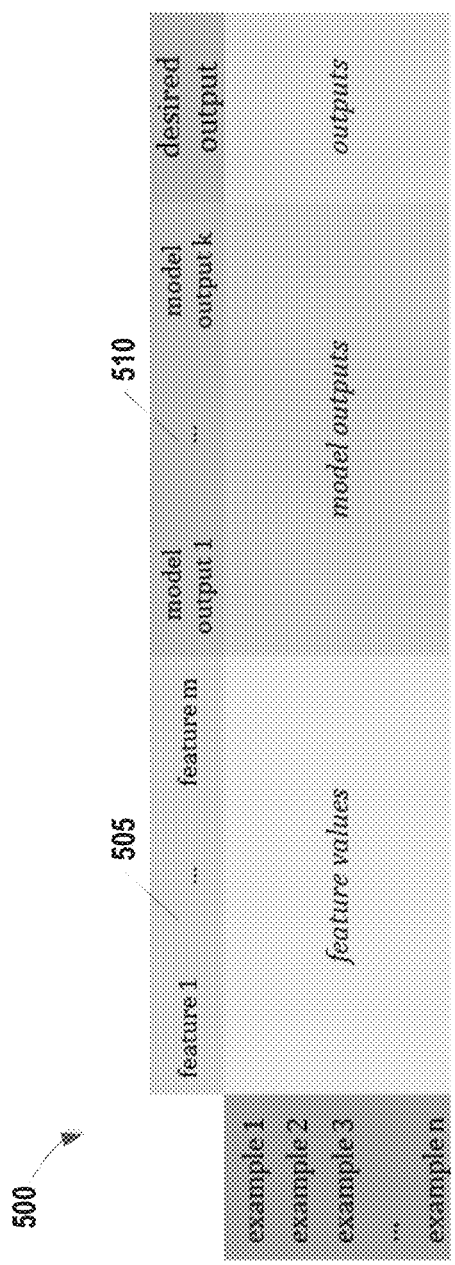
FIG. 5 provides an illustration of a table of examples for the recursive learner, according to some embodiments of the present invention.

FIG. 5 provides an illustration of a table 500 of examples for the recursive learner, according to this embodiment of the present invention. Here, the inputs to the recursive learner include the feature values 505 as in the table shown in FIG. 3, but also the output values 510 for each model. The system learns a function that combines these m+k features into a single predicted output value. Note that models with generally poor performance may be implicitly ignored by this method, as desired, and also that each example will effectively generate a unique combining function. In some embodiments, the recursive learning task can be simplified by suppressing the m feature values entirely, or by selecting only a few features with the most mutual information with the desired output.

Figure 6:
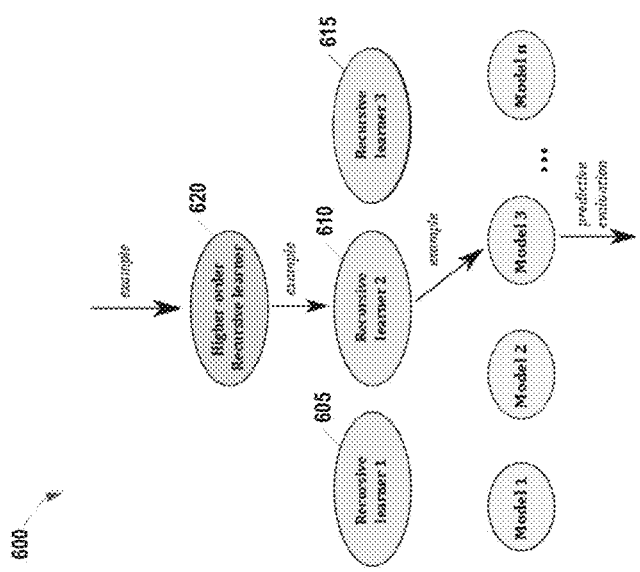
FIG. 6 provides an illustration of a procedure for hierarchical recursive learning, as used in some embodiments of the present invention.

FIG. 6 provides an illustration of a procedure 600 for hierarchical recursive learning, as used in some embodiments of the present invention. The process of creating the recursive learner may be subject to the same laws as the induction problem for the models themselves. For example, if the predictive accuracy may benefit from the described ensemble methodology, the recursive learner may also benefit from a similar strategy. This recursive procedure illustrated in FIG. 6 illustrates a simple case of three recursive learners 605, 610, and 615, and one higher-order recursive learner 620. Here, each recursive learner 605, 610, and 615 is formed from different set of parameters or different learning methods (e.g., one recursive learner could be a decision tree and the other variants on neural network learning). The higher-order recursive learner 620 learns which of these three learners 605, 610, and 615 to gate an example to, and then the identified recursive learner decides on the appropriate model. In FIG. 6, the second recursive learner 610 is chosen which then chooses model 3. This process may be easily generalized to a greater number of recursive learners and a larger number of recursive learning layers.

Figure 7:
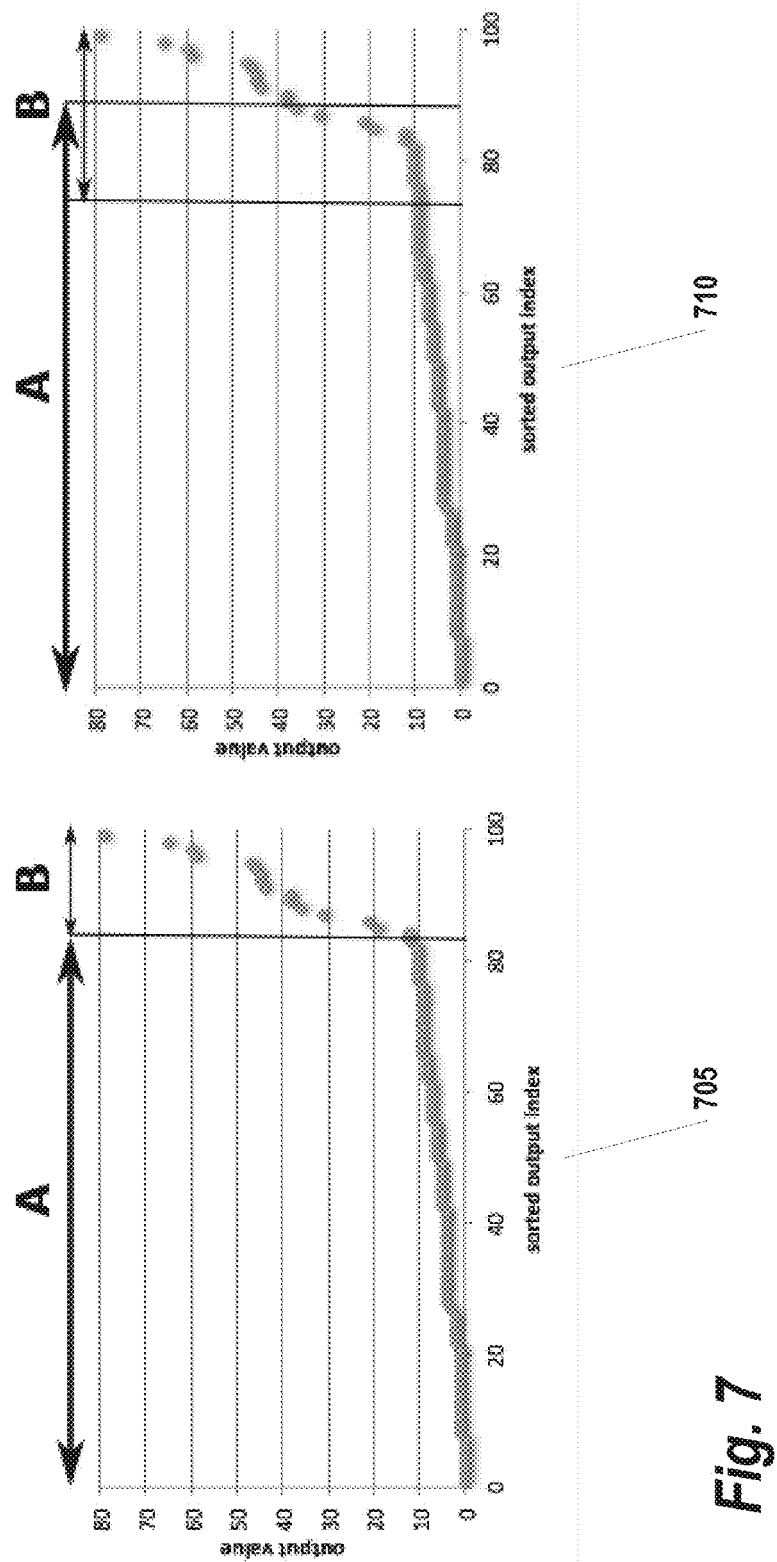
FIG. 7 provides an illustration of a skewed output distribution and two partitioning strategies, according to some embodiments of the present invention.

One or more of the embodiments discussed above may be combined with an additional division of models based on an output value partitioning strategy. FIG. 7 provides an illustration of a skewed output distribution and two partitioning strategies, according to some embodiments of the present invention. It is common in naturally occurring data sets to see a skewed distribution of outputs such as graph 705 of FIG. 7. Here, the x-axis is the sorted index of the data point, and the y-axis the value. It can be seen that the majority (in this case, ~80% of the values) of values are less than 10% of the range of the total set of outputs. This may adversely affect training in the sense that the learner can achieve a relatively good mean error simply by attempting to account for these lower values, and ignoring the higher ones.

One natural solution, then, is to partition the training problem into a model (or an ensemble of models in the general case) to cover partition A, for the lower values, and another model or set to cover partition B, for the upper values. The recursive learner then would choose which model to send a given example to. It may also be desirable to send some examples to both models, as in graph 710 of FIG. 7. With this method, a subset of both the training examples as well as examples to be scored, ideally on the border of the inflection point of the distribution, will benefit from both models, and the final result can be taken as an average of the models for these cases.

Figure 8:
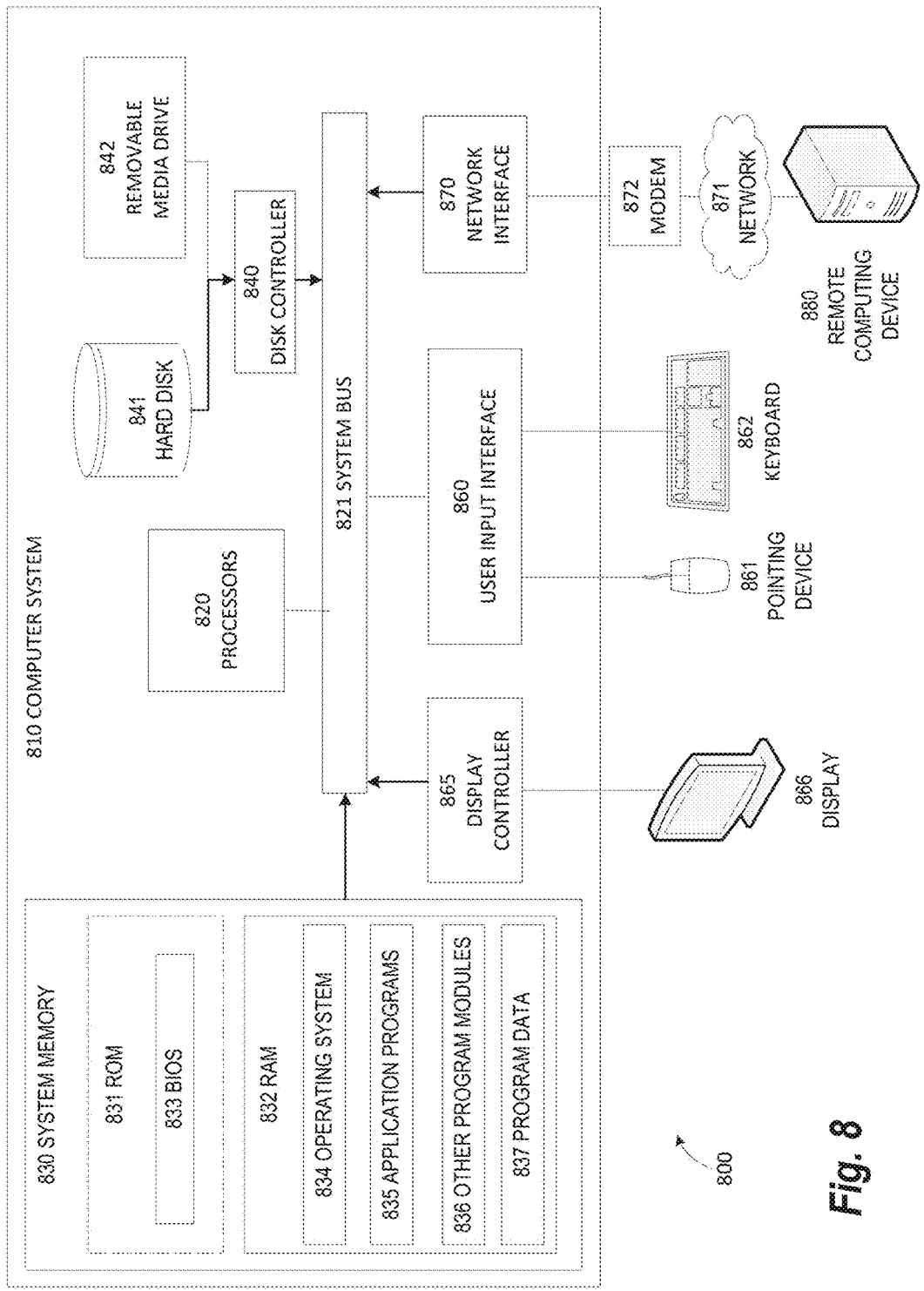
FIG. 8 illustrates an exemplary computing environment within which embodiments of the invention may be implemented.

FIG. 8 illustrates an exemplary computing environment 800 within which embodiments of the invention may be implemented. For example, computing environment 800 may be used to implement one or more components of system 100 shown in FIG. 1. Computers and computing environments, such as computer system 810 and computing environment 800, are known to those of skill in the art and thus are described briefly here.

As shown in FIG. 8, the computer system 810 may include a communication mechanism such as a system bus 821 or other communication mechanism for communicating information within the computer system 810. The computer system 810 further includes one or more processors 820 coupled with the system bus 821 for processing the information.

The processors 820 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may be coupled (electrically and/or as comprising executable components) with any other processor enabling interaction and/ or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 8, the computer system 810 also includes a system memory 830 coupled to the system bus 821 for storing information and instructions to be executed by processors 820. The system memory 830 may include computer readable storage media in the form of volatile and/or nonvolatile memory, such as read only memory (ROM) 831 and/or random access memory (RAM) 832. The RAM 832 may include other dynamic storage device(s) (e.g., dynamic RAM, static RAM, and synchronous DRAM). The ROM 831 may include other static storage device(s) (e.g., programmable ROM, erasable PROM, and electrically erasable PROM). In addition, the system memory 830 may be used for storing temporary variables or other intermediate information during the execution of instructions by the processors 820. A basic input/output system 833 (BIOS) containing the basic routines that help to transfer information between elements within computer system 810, such as during start-up, may be stored in the ROM 831. RAM 832 may contain data and/or program modules that are immediately accessible to and/or presently being operated on by the processors 820. System memory 830 may additionally include, for example, operating system 834, application programs 835, other program modules 836 and program data 837.

The computer system 810 also includes a disk controller 840 coupled to the system bus 821 to control one or more storage devices for storing information and instructions, such as a magnetic hard disk 841 and a removable media drive 842 (e.g., floppy disk drive, compact disc drive, tape drive, and/or solid state drive). Storage devices may be added to the computer system 810 using an appropriate device interface (e.g., a small computer system interface (SCSI), integrated device electronics (IDE), Universal Serial Bus (USB), or FireWire).

The computer system 810 may also include a display controller 865 coupled to the system bus 821 to control a display or monitor 866, such as a cathode ray tube (CRT) or liquid crystal display (LCD), for displaying information to a computer user. The computer system includes an input interface 860 and one or more input devices, such as a keyboard 862 and a pointing device 861, for interacting with a computer user and providing information to the processors 820. The pointing device 861, for example, may be a mouse, a light pen, a trackball, or a pointing stick for communicating direction information and command selections to the processors 820 and for controlling cursor movement on the display 866. The display 866 may provide a touch screen interface that allows input to supplement or replace the communication of direction information and command selections by the pointing device 861.

The computer system 810 may perform a portion or all of the processing steps of embodiments of the invention in response to the processors 820 executing one or more sequences of one or more instructions contained in a memory, such as the system memory 830. Such instructions may be read into the system memory 830 from another computer readable medium, such as a magnetic hard disk 841 or a removable media drive 842. The magnetic hard disk 841 may contain one or more datastores and data files used by embodiments of the present invention. Datastore contents and data files may be encrypted to improve security. The processors 820 may also be employed in a multi-processing arrangement to execute the one or more sequences of instructions contained in system memory 830. In alternative embodiments, hard-wired circuitry may be used in place of or in combination with software instructions. Thus, embodiments are not limited to any specific combination of hardware circuitry and software.

As stated above, the computer system 810 may include at least one computer readable medium or memory for holding instructions programmed according to embodiments of the invention and for containing data structures, tables, records, or other data described herein. The term "computer readable medium" as used herein refers to any medium that participates in providing instructions to the processors 820 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 841 or removable media drive 842. Non-limiting examples of volatile media include dynamic memory, such as system memory 830. Non-limiting examples of transmission media include coaxial cables, copper wire, and fiber optics, including the wires that make up the system bus 821. Transmission media may also take the form of acoustic or light waves, such as those generated during radio wave and infrared data communications.

The computing environment 800 may further include the computer system 810 operating in a networked environment using logical connections to one or more remote computers, such as remote computing device 880. Remote computing device 880 may be a personal computer (laptop or desktop), a mobile device, a server, a router, a network PC, a peer device or other common network node, and typically includes many or all of the elements described above relative to computer system 810. When used in a networking environment, computer system 810 may include modem 872 for establishing communications over a network 871, such as the Internet. Modem 872 may be connected to system bus 821 via user network interface 870, or via another appropriate mechanism.

Network 871 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 810 and other computers (e.g., remote computing device 880). The network 871 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 871.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

We claim:

1. A computer-implemented method of performing recursive learning based on a plurality of feature values, the method comprising:
   generating, by a computer, a plurality of models for a plurality of input features;
   receiving, by the computer, a plurality of examples, each example providing a plurality of input feature values corresponding to the plurality of input features;
   applying, by the computer, a recursive learning process to each respective example included in the plurality of examples, the recursive learning process comprising:
      selecting a preferred model from the plurality of models, the preferred model providing a lowest predicted error value when applied to the respective example, and
      associating the respective example with the preferred model;
   receiving a new example comprising a plurality of new input feature values;
   using, by the computer, the plurality of new input feature values to select a similar example from the plurality of examples;
   identifying, by the computer, one or more corresponding preferred models associated with the similar example; and
   applying, by the computer, the one or more corresponding preferred models to the new example.

2. The method of claim 1, further comprising:
   associating each of the plurality of models with a score indicative of model quality;
   identifying the one or more corresponding preferred models associated with the similar example based on the score of each of the one or more corresponding preferred models;
   averaging results generated by applying the one or more corresponding preferred models to the new example to yield a final prediction.

3. The method of claim 1, further comprising:
   creating a plurality of recursive learners, each respective recursive learner corresponding to distinct set of parameters;
   creating a high-order recursive learner configured to select from the plurality of recursive learners based on feature-value pairs associated with a particular example; and
   using the high-order recursive learner to select a distinct recursive learner from the plurality of recursive learners based on the plurality of new input feature values,
   wherein the distinct recursive learner uses the plurality of new input feature values to select the similar example from the plurality of examples and identifies the one or more corresponding preferred models associated with the similar example.

4. The method of claim 3, wherein each of the plurality of recursive learners corresponds to a distinct learning method.

5. The method of claim 4, wherein at least one of the plurality of recursive learners corresponds to a decision tree learning method and at least one of the plurality of recursive learners corresponds to a neural network learning method.

6. The method of claim 1, further comprising:
   partitioning the plurality of new input feature values into a first set of input feature values and a second set of input feature values;
   using, by the computer, the first set of input feature values to select a first similar example from the plurality of examples;
   identifying, by the computer, one or more first preferred models associated with the first similar example;
   applying, by the computer, the one or more first preferred models to the first set of input feature values;
   using, by the computer, the second set of input feature values to select a second similar example from the plurality of examples;
   identifying, by the computer, one or more second preferred models associated with the second similar example; and
   applying, by the computer, the one or more second preferred models to the second set of input feature values.

7. The method of claim 6, further comprising
   generating a final prediction by averaging (i) first results generated by applying the one or more first preferred models to the first set of input feature values and (ii) second results generated by applying the one or more second preferred models to the second set of input feature values.

8. A computer system comprising one more processors and a non-volatile memory, wherein the non-volatile memory stores instructions that, when executed by the one or more processors, cause the one or more processors to perform a method comprising:

generating a plurality of models for a plurality of input features;

receiving a plurality of examples, each example providing a plurality of input feature values corresponding to the plurality of input features;

applying a recursive learning process to each respective example included in the plurality of examples, the recursive learning process comprising:

selecting a preferred model from the plurality of models, the preferred model providing a lowest predicted error value when applied to the respective example, and associating the respective example with the preferred model;

receiving a new example comprising a plurality of new input feature values;

using the plurality of new input feature values to select a similar example from the plurality of examples;

identifying one or more corresponding preferred models associated with the similar example; and applying the one or more corresponding preferred models to the new example.

9. The computer system of claim 8, wherein the method further comprises:

associating each of the plurality of models with a score indicative of model quality;

identifying the one or more corresponding preferred models associated with the similar example based on the score of each of the one or more corresponding preferred models;

averaging results generated by applying the one or more corresponding preferred models to the new example to yield a final prediction.

10. The computer system of claim 8, wherein the method further comprises:

creating a plurality of recursive learners, each respective recursive learner corresponding to distinct set of parameters;

creating a high-order recursive learner configured to select from the plurality of recursive learners based on feature-value pairs associated with a particular example; and using the high-order recursive learner to select a distinct recursive learner from the plurality of recursive learners based on the plurality of new input feature values, wherein the distinct recursive learner uses the plurality of new input feature values to select the similar example from the plurality of examples and identifies the one or more corresponding preferred models associated with the similar example.

11. The computer system of claim 10, wherein each of the plurality of recursive learners corresponds to a distinct learning method.

12. The computer system of claim 11, wherein at least one of the plurality of recursive learners corresponds to a decision tree learning method and at least one of the plurality of recursive learners corresponds to a neural network learning method.

13. The computer system of claim 8, wherein the method further comprises:

partitioning the plurality of new input feature values into a first set of input feature values and a second set of input feature values;

using the first set of input feature values to select a first similar example from the plurality of examples;

identifying one or more first preferred models associated with the first similar example;

applying the one or more first preferred models to the first set of input feature values;

using the second set of input feature values to select a second similar example from the plurality of examples;

identifying one or more second preferred models associated with the second similar example; and applying the one or more second preferred models to the second set of input feature values.

14. The computer system of claim 13, wherein the method further comprises:

generating a final prediction by averaging (i) first results generated by applying the one or more first preferred models to the first set of input feature values and (ii) second results generated by applying the one or more second preferred models to the second set of input feature values.

15. A non-transitory computer-readable medium storing instructions that, when executed by one or more processors, cause the one or more processors to perform a method comprising:

generating a plurality of models for a plurality of input features;

receiving a plurality of examples, each example providing a plurality of input feature values corresponding to the plurality of input features;

applying a recursive learning process to each respective example included in the plurality of examples, the recursive learning process comprising:

selecting a preferred model from the plurality of models, the preferred model providing a lowest predicted error value when applied to the respective example, and associating the respective example with the preferred model;

receiving a new example comprising a plurality of new input feature values;

using the plurality of new input feature values to select a similar example from the plurality of examples;

identifying one or more corresponding preferred models associated with the similar example; and applying the one or more corresponding preferred models to the new example.

16. The non-transitory computer-readable medium of claim 15, wherein the method further comprises:

associating each of the plurality of models with a score indicative of model quality;

identifying the one or more corresponding preferred models associated with the similar example based on the score of each of the one or more corresponding preferred models;

averaging results generated by applying the one or more corresponding preferred models to the new example to yield a final prediction.

17. The non-transitory computer-readable medium of claim 15, wherein the method further comprises:

creating a plurality of recursive learners, each respective recursive learner corresponding to distinct set of parameters;

creating a high-order recursive learner configured to select from the plurality of recursive learners based on feature-value pairs associated with a particular example; and using the high-order recursive learner to select a distinct recursive learner from the plurality of recursive learners based on the plurality of new input feature values, wherein the distinct recursive learner uses the plurality of new input feature values to select the similar example from the plurality of examples and identifies the one or more corresponding preferred models associated with the similar example.

18. The non-transitory computer-readable medium of claim 17, wherein each of the plurality of recursive learners corresponds to a distinct learning method.

19. The non-transitory computer-readable medium of claim 18, wherein at least one of the plurality of recursive learners corresponds to a decision tree learning method and at least one of the plurality of recursive learners corresponds to a neural network learning method.

20. The non-transitory computer-readable medium of claim 15, wherein the method further comprises:
   partitioning the plurality of new input feature values into a first set of input feature values and a second set of input feature values;
   using the first set of input feature values to select a first similar example from the plurality of examples;
   identifying one or more first preferred models associated with the first similar example;
   applying the one or more first preferred models to the first set of input feature values;
   using the second set of input feature values to select a second similar example from the plurality of examples;
   identifying one or more second preferred models associated with the second similar example; and
   applying the one or more second preferred models to the second set of input feature values.

21. The non-transitory computer-readable medium of claim 20, wherein the method further comprises:
   generating a final prediction by averaging (i) first results generated by applying the one or more first preferred models to the first set of input feature values and (ii) second results generated by applying the one or more second preferred models to the second set of input feature values.

* * * * *